(12) United States Patent
Moll et al.

(10) Patent No.: US 7,330,728 B1
(45) Date of Patent: Feb. 12, 2008

(54) METHOD AND SYSTEM FOR LOCATING A MOBILE SUBSCRIBER TERMINAL WHEN ROAMING

(75) Inventors: Keith Moll, Olathe, KS (US); Brent Burpee, Olathe, KS (US); Jesse Grindeland, Olathe, KS (US); Scott Wilson, Shawnee, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 10/877,580

(22) Filed: Jun. 25, 2004

(51) Int. Cl.
*H04Q 7/20* (2006.01)
(52) U.S. Cl. .............................. 455/456.3; 455/456.1; 455/432.1
(58) Field of Classification Search ............ 455/414.2, 455/414.3, 456.1–456.6, 457, 404.1, 404.2, 455/422.1, 432.1, 433; 342/357.01, 357.02, 342/357.06, 357.08
See application file for complete search history.

(56) References Cited

U.S. PATENT DOCUMENTS

| | | | |
|---|---|---|---|
| 6,138,003 A | 10/2000 | Kingdon et al. | |
| 6,519,232 B1 | 2/2003 | Becher | |
| 6,754,482 B1* | 6/2004 | Torabi | ......................... 455/410 |
| 6,836,667 B1* | 12/2004 | Smith, Jr. | ................. 455/456.1 |
| 6,897,805 B2* | 5/2005 | Bajikar | .................. 342/357.06 |
| 7,023,995 B2* | 4/2006 | Olsson | ......................... 380/258 |
| 2002/0035605 A1 | 3/2002 | McDowell et al. | |
| 2002/0087726 A1 | 7/2002 | Macpherson et al. | |
| 2002/0094822 A1 | 7/2002 | Anctil et al. | |
| 2002/0111154 A1 | 8/2002 | Eldering et al. | |
| 2002/0119766 A1 | 8/2002 | Bianconi et al. | |
| 2002/0137523 A1* | 9/2002 | Diggelen | ..................... 455/456 |
| 2002/0173317 A1 | 11/2002 | Nykanen et al. | |
| 2003/0007464 A1 | 1/2003 | Balani | |
| 2003/0032409 A1 | 2/2003 | Hutcheson et al. | |
| 2003/0040324 A1 | 2/2003 | Eldering et al. | |
| 2003/0060214 A1 | 3/2003 | Hendrey et al. | |
| 2003/0088556 A1 | 5/2003 | Allen, III | |
| 2003/0134648 A1 | 7/2003 | Reed et al. | |
| 2003/0148774 A1 | 8/2003 | Naghian et al. | |
| 2003/0157942 A1 | 8/2003 | Osmo | |
| 2003/0231755 A1 | 12/2003 | Akhteruzzaman et al. | |

(Continued)

OTHER PUBLICATIONS

"Personal Location Technology", Roke Manor Research Limited, A Siemens Company, 1998-2004, printed from the Worldwide Web < http://www.roke.co.uk/communications/cellular/location_technology.asp on Jun. 25, 2004.

(Continued)

*Primary Examiner*—CongVan Tran

(57) ABSTRACT

A method and system for locating a mobile-subscriber terminal (MST) roaming in a serving network is provided. A location based service provider (LBSP) that is outside of the serving network receives from the serving system an MST-initiated request for providing location based services (LBSs) and an identifier of a first location system (LS1) that is associated with the serving network. Responsive to the MST-initiated request, the LBSP sends to a second location system (LS2) (i) a request for mobile positioning information (MPI) for the MST, and (ii) the identifier. Using the identifier, the LS2 addresses and sends the request for MPI to the LS1. Responsively, the LS1 sends to the LS2 the MPI. The LS2 then send the MPI to the LBSP, which in turn sends to the MST a reply to the MST-initiated request for LBSs.

25 Claims, 9 Drawing Sheets

U.S. PATENT DOCUMENTS

| | | | |
|---|---|---|---|
| 2004/0043773 A1* | 3/2004 | Lee et al. | 455/456.1 |
| 2004/0157620 A1* | 8/2004 | Nyu | 455/456.1 |
| 2004/0248551 A1* | 12/2004 | Rowitch et al. | 455/410 |
| 2004/0253964 A1* | 12/2004 | Zhu | 455/456.3 |
| 2005/0085247 A1* | 4/2005 | Bajko et al. | 455/466 |
| 2005/0153706 A1* | 7/2005 | Niemenmaa et al. | 455/456.1 |

OTHER PUBLICATIONS

Bhaduri, Anuket, "Overview of IETF Geo Privacy Internet Draft", printed from the world wide web <http://www.spatial.maine.edu/~anuket/research/geopriv.doc> on Jun. 25, 2004.

"Location Dependent Services", Roke Manor Research Limited 2002, printed from the world wide web <http://www.roke.co.uk/download/datasheets/Location_Dependent_Services.pdf> on Jun. 25, 2004.

Cuellar Jorge, Morris John B., Mulligan Deirdre, Peterson Jon, and Polk James, "Geopriv Requirements", Internet Draft Document: draft-ietf-geopriv-reqs-03.txt, Mar. 2003, pp. 1-27.

Prasad, Maneesh, "Location Based Services", Location based services. txt, pp. 1-3, printed from the world wide web on Jun. 2003.

Tschofenig Geopriv H., Siemens J. Cuellar, "Geopriv Authorization Policies" Internet Engineering Task Force, Jun. 2003, pp. 1-15.

H. Schulzrinne, "DHCP Option for Civil Location", Internet Engineering Task Force, Feb. 19, 2003, pp. 1-8.

H. Schulzrinne, "Location Objects and Location Privacy Information for Presence Information draft-schullzrinne-geopriv-presence-lo-00", Network Working Group, Jun. 22, 2003, pp. 1-17.

Polk James M., Schnizlein John, Linsner Mar, "Semantics for DHC Location Object within GEOPRIV" Internet Engineering Task Force, Oct. 25, 2002, pp. 1-10.

Polk James M. Cuellar Jorge, "GEOPRIV Location Data Considerations", Geopriv WG Internet Draft, Oct. 2002, pp. 1-11.

J. Peterson, "A Presence-Based GEOPRIV Location Object Format Draft-Peterson-Geopriv-pidf-lo-00" GEOPRIV WG Internet-Draft, Jun. 22, 2003, pp. 1-14.

J. Peterson, "A Presence Architecture for the Distribution of Geopriv Location Objects Draft-Peterson-Geopriv-pres-00", GEOPRIV WG Internet Draft, Feb. 24, 2003, pp. 1-8.

"What Are Location Based Services?" Location Based Services-Definition, 2003, p. 1.

Danley M., Mulligan D., Morris J., Peterson J., Threat Analysis of the Geoprive Protocol draft-ietf-geopriv-threat-analysis-00, geopriv WG Internet-Draft, Feb. 20, 2003, pp. 1-16.

Polk James M., Schnizlein John, Linsner Marc, "DHC Location Object within GEOPRIV", Internet Engineering Task Force Draft, Jan. 17, 2003, pp. 1-11.

Polk J., Schnizlein J., Linsner M., "Location Configuration Information for GEOPRIV", Internet Engineering Task Force Internet Draft, Jun. 16, 2003, pp. 1-12.

Schulzrinne H., "DHCP Option for Civilian Location", Internet Engineering Task Force Internet Draft, Jun. 27, 2003, pp. 1-9.

Cuellar J., Morris J., Kanai T., "Geopriv Scenarios and Use Cases", Internet Draft Document: draft-cuellar-geopriv-scenarios-03.txt, Mar. 2003, pp. 1-32.

Cuellar J. , Guenther C., "Geopriv Location Object Markup Language", Internet Draft Document: draft-cuellar-geopriv-lo-ml-01.txt, Jun. 2003, pp. 1-30.

U.S. App. No. 10/876,913, filed Jun. 25, 2004 entitled "Method and System for Sharing and/or Centralizing Mobile Positioning Information and Geospatial Data for Roaming Mobile Subscriber Terminals".

U.S. App. No. 10/877,253, filed Jun. 25, 2004 entitled "Method for Providing Location Based Services to a Mobile Subscriber Terminal When Roaming".

\* cited by examiner

METHOD AND SYSTEM FOR LOCATING A MOBILE SUBSCRIBER TERMINAL WHEN ROAMING

BACKGROUND

1. Field

The present invention relates to mobile communications and, more particularly, to a method and system for providing location based services to a mobile subscriber terminal roaming outside the network to which it subscribes.

2. Description of Related Art

Cellular wireless communication is an increasingly popular means of personal communication in the modern world. People are using cellular wireless networks for the exchange of voice and data over cellular telephones, Personal Digital Assistants ("PDAs"), cellular telephone modems, and other devices. In principle, a user can seek information over the Internet or call anyone over a Public Switched Telephone Network ("PSTN") from any place inside the coverage area of the cellular wireless network.

An important feature of contemporary cellular wireless networks is an ability to locate the geographical position of a mobile-subscriber terminal. Such a feature was developed, at least in part, to assist emergency services in locating a mobile-subscriber terminal. For example, in the United States, the Federal Communications Commission ("FCC") has mandated the implementation of "Enhanced 911" ("E911") services to facilitate the location of mobile-subscriber terminals.

The E911 mandate was divided into two phases. According to Phase 1, the location must be identified with an accuracy of at least a cell and sector. Because this information is typically maintained by a wireless cellular carrier in a subscriber's home location register ("HLR"), Phase 1 presented little technical challenge. According to Phase 2, the location must be provided with an accuracy of at least 50 meters 67% of the time and 150 meters 95% of the time for handset based location techniques (100 and 300 meters for network-based location techniques), which is far more granular than the cell and sector information maintained in the HLR. In response, the Telecommunications Industry Association ("TIA") has proposed a new standard for "Enhanced Wireless 9-1-1, Phase II" or "TIA/EIA/IS-J-STD-036" ("J-STD-036"), American National Standard Institute, Jul. 11, 2000, the entirety of which is hereby incorporated by reference.

In order to achieve the accuracy specified by Phase 2, a cellular wireless network may employ special position determining equipment and techniques. Alternatively, a mobile subscriber terminal itself may employ a position determining system such as a GPS system and may relay its position to the network, for reference by the emergency services. The emergency services may then use the position of the mobile subscriber terminal to help assist a user of the mobile-subscriber terminal.

Cellular wireless carriers and third-party application providers have recognized the commercial significance of this new-found location information, well beyond use of the information for emergency services. In particular, knowing where a mobile subscriber terminal is located (e.g., mobile positioning information), the cellular wireless carriers and third-party application providers may now provide a wide range of valuable location based services.

Location based services are applications that supply information as a function of a geographic trigger. The geographic trigger might be a town name, zip code, street, a position of a mobile-subscriber terminal, and/or the position of a vehicle. In other words, location based services can be generally defined as the ability to find a geographical location of a device or person and provide services based on this geographical location. For instance, using mobile positioning information, a location based service can provide to a mobile subscriber terminal directions to a local restaurant, sporting arena, pub, etc. Location based services may also include business application such as location-sensitive billing, traffic updates, fleet management, asset tracking, and people tracking.

However, each wireless carrier only provides such services to their own subscribers. Thus, even though a mobile subscriber terminal may be able to carry on a voice and data communication when roaming outside the network to which it subscribes, requests for location based services from these non-subscribers are not carried out. This is due to, in part, technological differences between the service providers, federally and contractually determined delineated coverage areas, access to local geographical information, etc. Further, the lack of intersystem location based services is amplified when the mobile subscriber terminal roams across international boundaries, where geographical information for the foreign country is not maintained or available to the service provider of the mobile-subscriber terminal.

SUMMARY

In accordance with one aspect of the invention, a method for locating a mobile subscriber terminal that is roaming in a coverage area of a serving network is provided. In the method, a location based service provider that is outside of the serving network may receive from the serving system (i) a request for location based services, e.g., a request for directions to a restaurant located within a coverage area of the serving; and (ii) an identifier that is indicative of a first location system that is associated with the serving network. The request for location based services may be initiated by the mobile subscriber terminal, and the identifier may be provided by the serving network.

Responsive to the request for location based services, the location based service provider may send to a second location system (i) a request for mobile positioning information for the mobile subscriber terminal, and (ii) the identifier. The second location system may be associated with a subscriber system to which the mobile subscriber terminal subscribes.

Using the mobile positioning information, the second location system may address and send the request for mobile positioning information to the first location system. Responsive to this request, the first location system may send to the second location system the mobile positioning information. The second location system may receive the mobile positioning information from the first location system, and in turn, send the mobile positioning information to the location-based-service provider.

BRIEF DESCRIPTION OF THE DRAWINGS

Preferred embodiments of the present inventions are described with reference to the following Figures, wherein like reference numerals refer to like elements in the various figures, and wherein.

DETAILED DESCRIPTION

System Architecture

Figure 1:
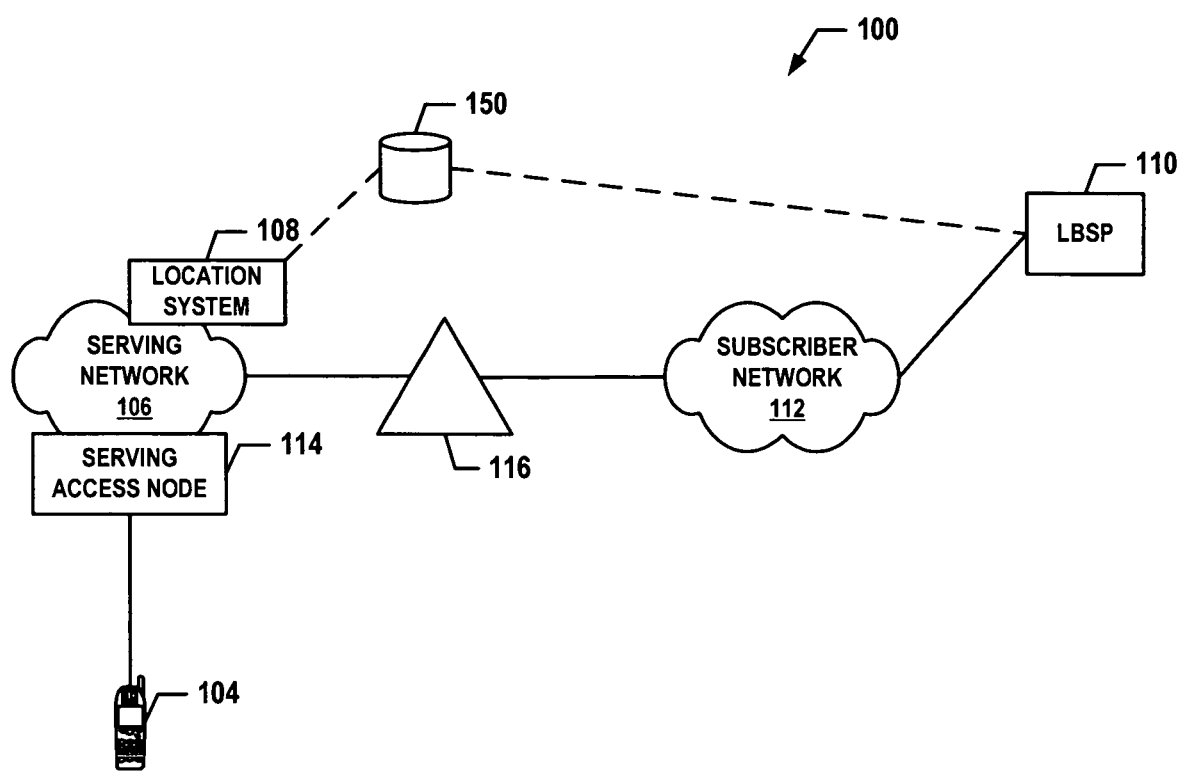
FIG. 1 is a first block diagram of a system for serving location based services (LBSs) to a mobile subscriber terminal roaming in a coverage area of a serving network.

FIG. 1 is a block diagram of a system 100 for serving location based services (LBSs) to a mobile subscriber terminal (MST) 104 roaming in a coverage area of a serving network 106. A serving access node 114 couples the MST 104 to the serving network 106, which is associated with or has access to a location system 108. The location system 108 may be coupled to or otherwise access to a geographical information system (GIS) data store 150. A serving gateway 116 couples the serving network 106 to a subscriber network 112. The subscriber network 112 includes, or has access to, a location-based service provider (LBSP) 110, which may also have access to or otherwise access the GIS data store 150. The system 100 may also be deployed other network elements not depicted in FIG. 1, such as switching and routing devices.

The MST 104 subscribes to the subscriber network 112, and as depicted in FIG. 1 is a cellular telephone. However, the MST 104 may be any device that can request LBSs and can be located by the location system 108. For example, the MST 104 may be a computer, a handheld device having a GPS chipset, a personal digital assistant or the like. In the illustrated example, although the MST 104 subscribes to the subscriber network 112, it is capable of roaming and operating the other networks, such as the serving network 106.

When operating in the coverage area of the serving network 106, the MST 104 may communicate with the serving access node 114 over a wireless interface. The serving access node 114 may be, for example, a combination of base transceiver station (BTS) and a base controller station (BSC), a packet data serving node (PDSN), and/or other network access server through which the communications may be served or otherwise exchanged between the MST 104 and the serving network 106.

The serving network 106 may be partial or full deployment of most any communication or computer network, and thus, can include a few or many network elements. Like the serving network 106, the subscriber network 112 may be partial or full deployment of most any communication or computer network, and thus, can include a few or many network elements. Thus, the serving and subscriber networks 106, 112 can include elements of any public or private terrestrial wireless or satellite, and/or wireline networks.

The serving and subscriber networks 106, 112 can also include circuit-switched as well as packet-data elements to provide transport of voice and data communications among the MST 104, any of a number of serving and subscriber network elements, the serving gateway 116, the LBSP 110 and/or other node. Details of preferred public and private networks may be found in co-pending U.S. patent application Ser. No. 10/748,599, filed on Dec. 29, 2003, and entitled "Roaming-Agreement Application and Database for Roaming between Public and Private Wireless Networks," the contents of which are fully incorporated herein by reference.

The serving network 106 may include various internal interconnected network elements to provide one or more segments of the communication path between the MST 104 and the serving gateway 116. The subscriber network 112 may include various internal interconnected network elements to provide one or more segments of the communication path between the serving gateway 116 and the LBSP 110.

In practice, the serving and subscribing networks 106, 112 may include elements of Public Switched Telephone Networks, such as the hardware and services provided by local exchange carriers (LECs) and interexchange carriers (IXCs); private wireline networks, such as enterprise Private Branch Exchange; and/or public and private wireless networks, such as a Sprint PCS network and/or a license-free, Industrial, Scientific and Medical (ISM) band wireless network.

Known formats and protocols may be used for communicating over the wireless interface, the serving network 106, and the subscriber network 112. For example, the formats and protocols for communications over the serving and subscriber networks 106, 112 may be specified by the Advanced Intelligent Network (AIN)/Signaling System 7 (SS7), other plain old telephone service (POTS) protocols, Ethernet specification, and/or IEEE 802 standard.

In the case of the wireless portion of the communication channel, the formats and protocols may be according to commonly used public wireless interface formats, such as Advanced Mobile Phone Service (AMPS), Time Division Multiple Access (TDMA), Global System for Mobile Communications (GSM), and Code Division Multiple Access (CDMA), Universal Mobile Telecommunications Service ("UMTS"), Wide-band CDMA ("WCDMA"), CDMA2000, and Generic Packet Radio Services ("GPRS"). The format of the wired or wireless interface in a private network may be based on the Ethernet (IEEE 802.3 specification, the Telecommunications Industry Association (TIA/EIA) IS-94 Recommendation entitled "Mobile Station—Land Station Compatibility Specification for Analog Cellular Auxiliary Personal Communications Services" ("IS-94"), the Bluetooth specification, the IEEE 802.11 standards, and/or other wireless local area network specification, in addition to the formats and/or protocols of the public wireless and/or wireline networks.

Although the serving and subscriber networks 106, 112 are shown separately, they alternatively may be the same network or interconnected by any number of intermediate networks. If the serving and subscriber networks 106, 112 overlap, then the mutual or common elements can behave as one entity. Alternatively, the functions of the mutual or common elements may be distributed among various network elements of both the serving network 106 and subscriber network 112.

Coupled between the serving network 106 and the subscriber networks 112 is the serving gateway 116. The serving gateway 116 may be, for example, an AIN/SS7 signal transfer point, an internetworking function, a media gateway, and/or other server through which communications may be served to or otherwise exchanged between the serving network 106 and the subscriber network 112.

The serving gateway 116 also provides a path by which the LBSP 110 can query the serving network 106, the MST 104, and/or location system 108. However, the LBSP 110 may communicate with serving network 106, the MST 104, and/or location system 108 using alternative paths, for example, via an intermediate network located between the serving gateway 116 and the subscriber network 112 or via another gateway to the serving network 106.

The location system 108 may be a part of, or distinct from but connected to, the serving network 106. The location system 108 may function to (i) determine and/or report the location or other geospatial information associated with the MST 104 (i.e., mobile positioning information); and/or (ii) obtain and report geospatial information indicative of the serving network 106 and/or the elements thereof, including, for instance, the serving access node 114. As such, the location system 108 could take a variety of forms. For example, the location system 108 may include a mobile positioning center ("MPC") and a position determining entity ("PDE"), and any other entity defined by J-STD-036 or any other system or method, with which those skilled in the art are familiar. Details of a preferred location system may be found in co-pending application Ser. No. 09/826,139, filed on Apr. 4, 2001, and entitled "Position Determining System for Location Based Information to a Mobile Station," the entire contents of which are incorporated herein by reference.

The location system 108 may use various techniques for determining and reporting the mobile positioning information associated with the MST 104. These techniques may range from a fairly accurate technique (e.g., within 500 meters) using a cell-of-origin (COO) method to a very precise technique (e.g., within 5 meters) using GPS coordinates and other navigational derivatives. The location system 108 may also use other techniques that provide location accuracy that is within the accuracy provided by COO and GPS. Such techniques include the well known techniques of Enhanced Observed Time Difference (E-OTD) technique, Time of Arrival (TOA) technique, and Angle of Arrival (AOA) technique. Unlike GPS, however, these techniques may require reference beacons or antennas stationed within the serving network 106. The location system 108 may also use other techniques that provide location accuracy that is (I) less accurate that COO or more accurate than GPS.

Coupled to the location determining system 108 is the GIS data store 150 which contains geospatial information about the coverage area of the serving network 106. This GIS data store 150 may be deployed, for example, as a database that contains geospatial information zip codes, maps, environmental and evolutionary trends, and/or other geographical information system information (typically referred to as "geocode data") about the coverage area of the serving network 106. Numerous details of the type of geospatial information that may be obtained and/or stored may be found in "A Practitioner's Guide to GIS Terminology" by Stearns J. Wood.

The LBSP 110 may be a network node or set of network nodes that are associated with the subscriber network 112 and that are configured to provide location based services to subscribers of the subscriber network 112, such as the MST 104. The LBSP 110 may be, for example, a concentrated on a distributed plurality of computers deployed in a peer-to-peer or, alternatively, a client/server arrangement.

To respond to requests for location based services from the MST 104, the LBSP 110 may ascertain, learn, or otherwise determine (i) the mobile positioning information for the MST 104 and (ii) other content, such as geospatial information, about the coverage area in which the MST 104 is operating. When the MST 104 makes a request for location based services while operating in subscriber network 112, the LBSP 110 may obtain (i) the mobile positioning information from a location system (not shown), such as the location system 108, associated with the subscriber network 112 and (ii) the geospatial information from a GIS data store (not shown) associated with the subscriber network 112.

However, when the MST 104 requests a location-based service from the LBSP 110 while roaming outside a coverage area of the subscriber network 112 and inside the coverage area of a serving wireless network 106, the location determining system of the subscriber network 112 is typically unable to provide the mobile positioning information for the MST 104. Further, the GIS data store associated with the subscriber network 112 may not contain the geospatial information corresponding to the mobile positioning information associated with MST 104.

Consequently, the LBSP 110 may need to not only obtain the mobile positioning information associated with the MST 104 from the location system 108 associated with the serving system 106, but also acquire the geospatial information about the coverage area of the serving network 106 from the GIS data store 150. The LBSP 110 may obtain the geospatial information directly from the GIS data store 150 or, alternatively, via the location system 108.

To facilitate obtaining the mobile positioning and geospatial information, the computer(s) of the LBSP 110 may be deployed in a peer-to-peer or a client/server arrangement with not only the MST 104, but also the serving network 106, location system 108, serving gateway 116, subscriber network 112, serving access node 114, and/or GIS data store 150.

That is, the LBSP 110 may act as a peer that is operable to initiate LBSs without a request from the MST 104, serving network 106, location system 108, serving gateway 116, subscriber network 112, serving access node 114, and/or GIS data store 150. Alternatively, the LBSP 110 may act as a server that is operable to serve LBSs in response to requests initiated from the MST 104, serving network 106, location system 108, serving gateway 116, subscriber network 112, serving access node 114, and/or GIS data store 150.

The LBSP 110 may also use proxies to break any direct connection between it and MST 104, serving network 106, location system 108, serving gateway 116, subscriber network 112, serving access node 114, and/or GIS data store 150. In this way, responses to requests for LBSs are sent out a different communication port than the request for LBSs, thereby preventing malicious attacks on the LBSP 110.

Overview of Serving Location Based Services when Roaming

Figure 2:
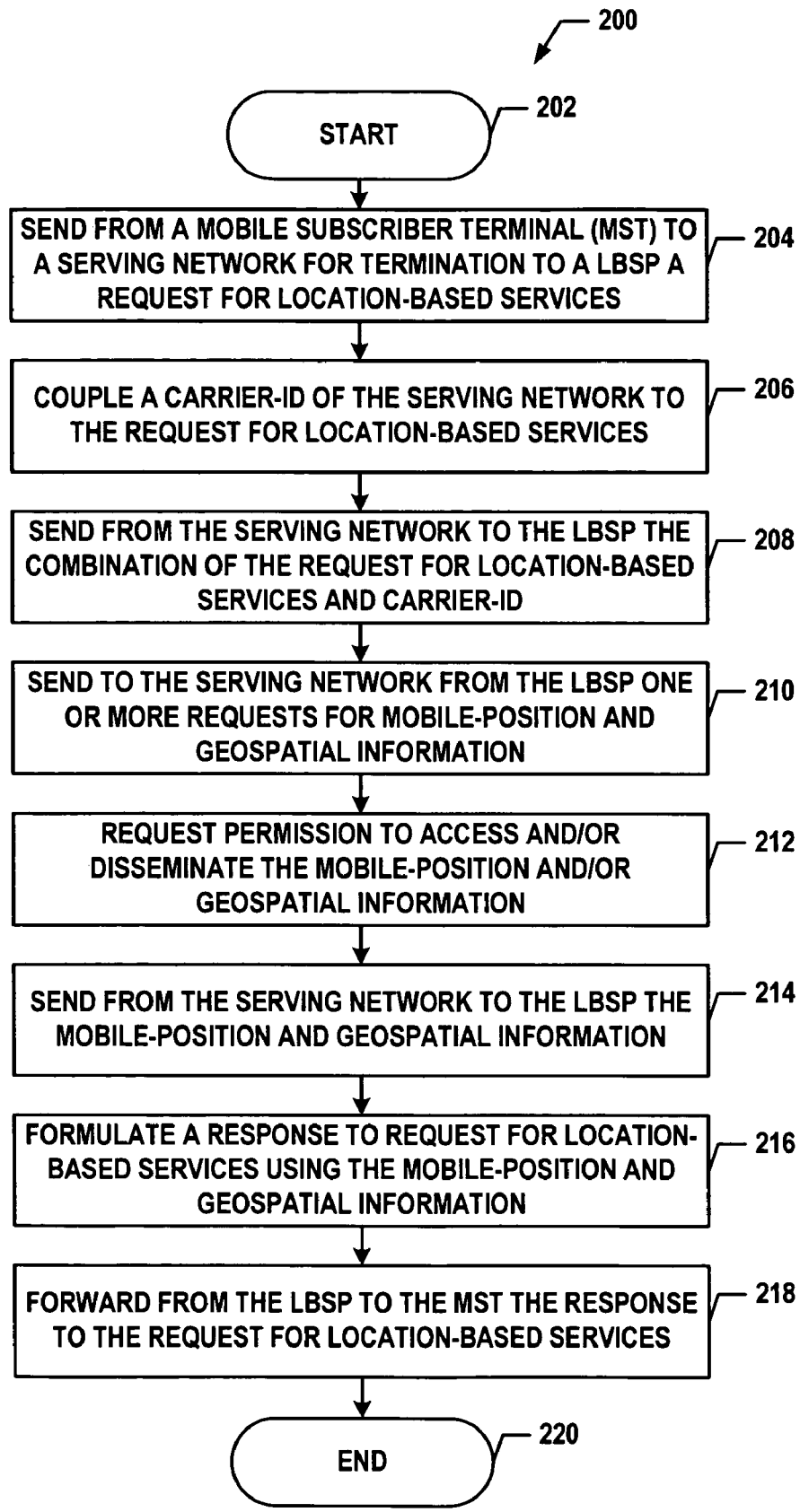
FIG. 2 is a flow diagram illustrating a flow for serving LBSs to a mobile subscriber terminal when roaming in a coverage area of a serving network.

FIG. 2 is a flow diagram illustrating a flow 200 for serving LBSs to the MST 104 when the MST 104 is roaming in a coverage area of the serving network 106. The flow 200 begins at state 202, when the MST 104 roams into the coverage area of the serving network 106. At state 204, the MST 104 sends to the serving network 106 (e.g., via the serving access node 114) a request for LBSs that is to be terminated to the LBSP 110.

Because the MST 104 is roaming, the LBSP 110 may need an identifier of the serving network 106 to which the LBSP 110 can address responsive communications, such as requests for the mobile positioning information and geospatial information. Thus, at state 206, the serving network 106 may couple or otherwise attach an identifier or "carrier-ID" of the serving network 106 to the request originated by the MST 104. This carrier-ID, may be for example, a system identifier ("SYSID") and/or network identifier ("NETID") of the serving network 106.

At state 208, the serving network 106 sends to the LBSP 110, via the serving gateway 116 and the subscriber network 112, the request for location based services and the carrier-ID. Using the carrier-ID, the LBSP 110, at state 210, sends one or more requests to the serving network 106 to acquire (i) mobile positioning information for the MST 104, and (ii) geospatial information based on this mobile positioning information. Alternatively, the LBSP 110 may, for example, first request the mobile positioning information from the serving network 106, and then query the GIS data store 150 directly for the geospatial information.

However, before mobile positioning information (or any content) is requested and/or provided, the LBSP 110 and/or the serving network 106 may seek permission from the subscriber network 112 to access and/or disseminate the mobile positioning information for the MST 104, as shown in state 212. For instance, before sending the requests for mobile positioning information and geospatial information, the LBSP 110 may query a subscriber record associated with the MST 104 for permission to access and/or disseminate the mobile positioning information associated with MST 104. This captures that state 212 may occur before state 210, which would be desirable in terms of reducing demands on network resources in cases where the subscriber has not given permission to be located.

Alternatively, the serving network 106 might query the subscriber record associated with the MST 104 for permission to disclose the mobile positioning information in response to receiving the request for mobile positioning information and geospatial information from the LBSP 110. As described in more detail below, even if permission is granted, the granularity of the mobile positioning information that may be accessed, obtained, and/or disseminated, however, may be limited by the user and/or service provider.

At state 214, the serving network 106 sends the mobile positioning information and geospatial information to the LBSP 110 after receiving such information from the location system 108. Thereafter, the LBSP 110 formulates a response to the request for the LBSs using the mobile positioning information and geospatial information, as shown in state 216. At state 218, the LBSP 110 forwards the response to the request for LBSs to the MST 104 via the subscriber network 112, serving gateway 116, serving network 106, and serving access node 114. At state 220, the flow ends when the MST 104 receives the response to the request for LBSs.

As described in more detail below, the back and forth communication among the serving network 106, LBSP 110 and/or subscriber network 112 may be carried out using various network elements of the serving network 106 and the subscriber network 112. For instance, requests and corresponding responses for the mobile positioning information may flow through the serving gateway 116 and through other switching and routing devices of the serving network 106 and subscriber 106, 112.

Alternatively, requests and corresponding responses for the mobile positioning information may flow between the location system 108 and the location system of the subscriber network 112 independent of the serving gateway 116. In another alternative, the mobile positioning information and geospatial information may be placed in a data store, such as a shared database, with the serving network 106 and the subscriber network 112 having access to the shared database.

Roaming Mobile-Subscriber Terminal's Request for Location Based Services

Figure 3:
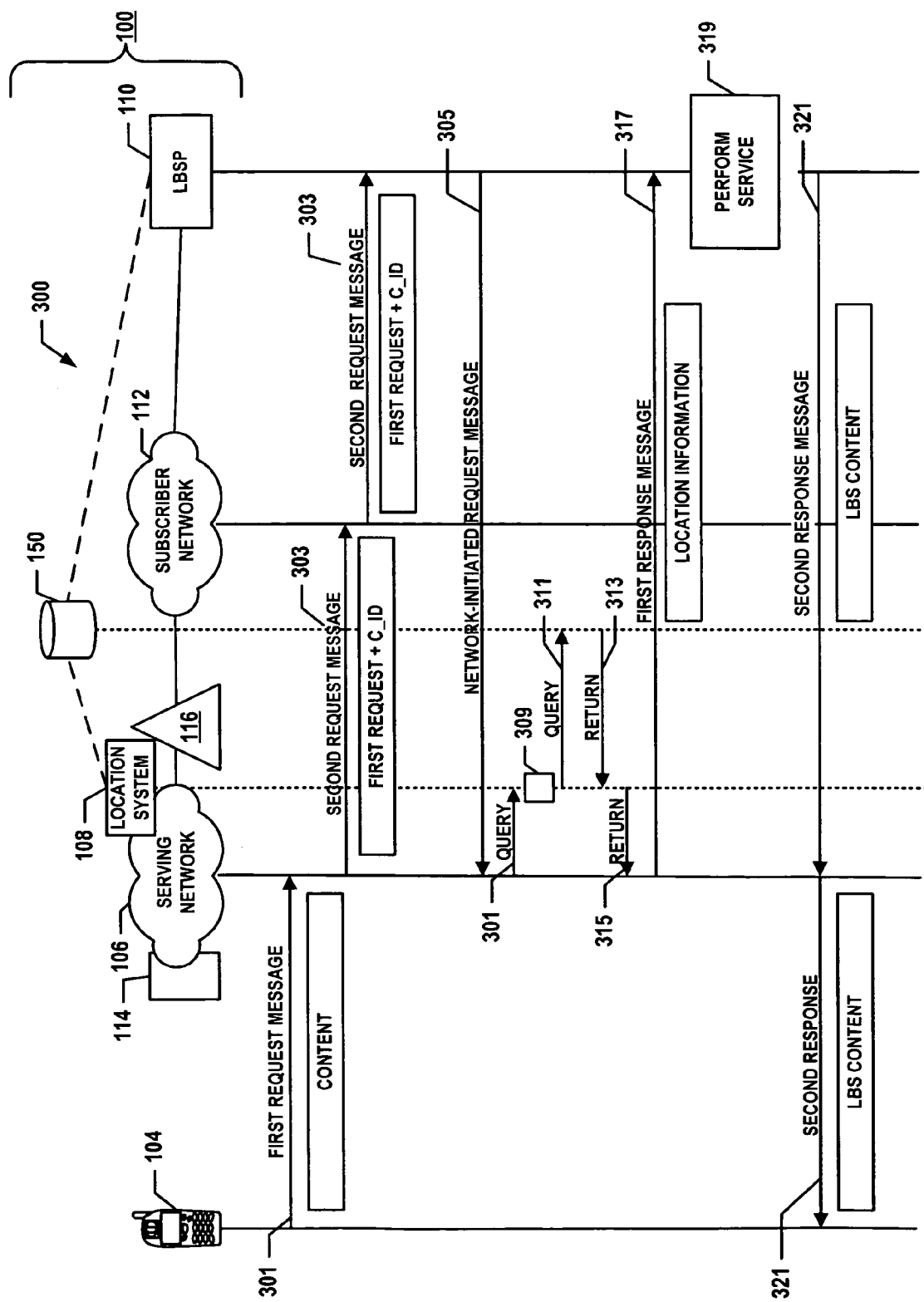
FIG. 3 is a first call flow diagram illustrating a call flow for serving LBSs to a mobile subscriber terminal when roaming in a coverage area of a serving network.

FIG. 3 is a first call flow diagram illustrating a call flow 300 for serving LBSs to the MST 104 when roaming in a coverage area of the serving network 106. This call flow 300 may be carried out using the system 100 shown in FIG. 1. While the call flow 300 may be used to carry out a multitude of LBSs, the following describes an example in which the MST 104 receives directions to a restaurant located within the coverage area of the serving network 106.

After roaming into the coverage area of the serving network 106, a user of the MST 104 initiates the request for the directions by entering an alphanumeric string or, if using voice content (that is later converted from voice content to data), speaks some information about the restaurant, e.g., the restaurant's name, into the MST 104. Assuming proper registration and/or authentication with the serving network 106, the MST 104 sends to the serving network 106 (via the serving access node 114) a first request message 301 that requests the directions from the LBSP 110. The first request message 301 contains the information about the restaurant entered by the user.

Since the MST 104 is roaming, the LBSP 110 may request the mobile positioning information associated with MST 104 and the location, e.g., the street, city and zip code, of the restaurant from the serving network 106. However, before the LBSP 110 can request such information, it has to have a way of contacting the serving network 106.

Thus, after the serving network 106 receives the first request message 301, it couples (e.g., inserts, appends, integrates into, commingles, encapsulates, or otherwise associates) the carrier-ID to the first request message 301. Thereafter, the serving network 106 sends to the subscriber network 112 (via, e.g., the serving gateway 116) a second request message 303 destined for the LBSP 110. This second request message 303 may contain the first request message 301 and the carrier-ID.

As an alternative, instead of to being sent together, the first request message 301 and carrier-ID may be sent separately to subscriber network 112 for forwarding to the LBSP 110. For instance, the first request message 301 may be relayed unchanged to the subscriber network 112, while the carrier-ID may be sent separately to the subscriber network 112 in another request message (not shown).

After receiving the second request message 303, the subscriber network 112 relays it to the LBSP 110 as shown. Before responding to the second request message 303 (i.e., the request and carrier-D), the LBSP 110 transmits its own request, e.g., a network-initiated-request message 305, to obtain mobile positioning information associated with the MST 104, and the location based service information, e.g., the street, city and zip code of the restaurant. Using the carrier-ID, the LBSP 110 addresses the network-initiated-request message 305 to the serving network 106 and then dispatches it.

The serving network 106 receives the network-initiated-request message 305. As shown by call flow element 307, the serving network 106 queries the location system 108 for mobile-position information associated with the MST 104 and, for example, the street, city and zip code of the restaurant.

The location system 108, using any mobile positioning technique, determines the mobile positioning information for the MST 104, as shown in call flow element 309. In addition, the location system 108 queries the GIS data store 150 for the street, city and zip code of the restaurant, as shown in call flow element 311. The GIS data store 150 returns the requested information, as shown in call flow element 313. After receiving the element 313, the location system 108 returns to the serving network 106 the mobile positioning information along with the street, city and zip code of the restaurant, as shown by call flow element 315.

Thereafter, the serving network 106 sends a first response message 317 to reply to the network-initiated-request message 305. The first response message 317 may contain the mobile positioning information along with the location-based service information.

After receiving the first response message 317, the LBSP 110 parses the mobile positioning information and the location based services information as needed. As shown by call flow element 319, the LBSP 110 then formulates a second response message 321 that includes the directions to the restaurant. Thereafter, the LBSP 110 addresses this second response message 321 to the MST 104 and sends it to the serving network 106 for delivery to the MST 104.

The serving network 106 receives the second response message 321 and relays it to the MST 104, as shown. The MST 104 receives the second response and delivers the directions to the restaurant to the user of the MST 104.

Although, in this example, the location of the restaurant is local to the serving network 106, the location need not be local and the user can provide more or different information about the restaurant or other place of interest. Moreover, the location-based service may be another service, such as providing a weather forecast for the coverage area of the serving network 106 in which the MST 104 is roaming.

Alternative System Architecture

Figure 4:
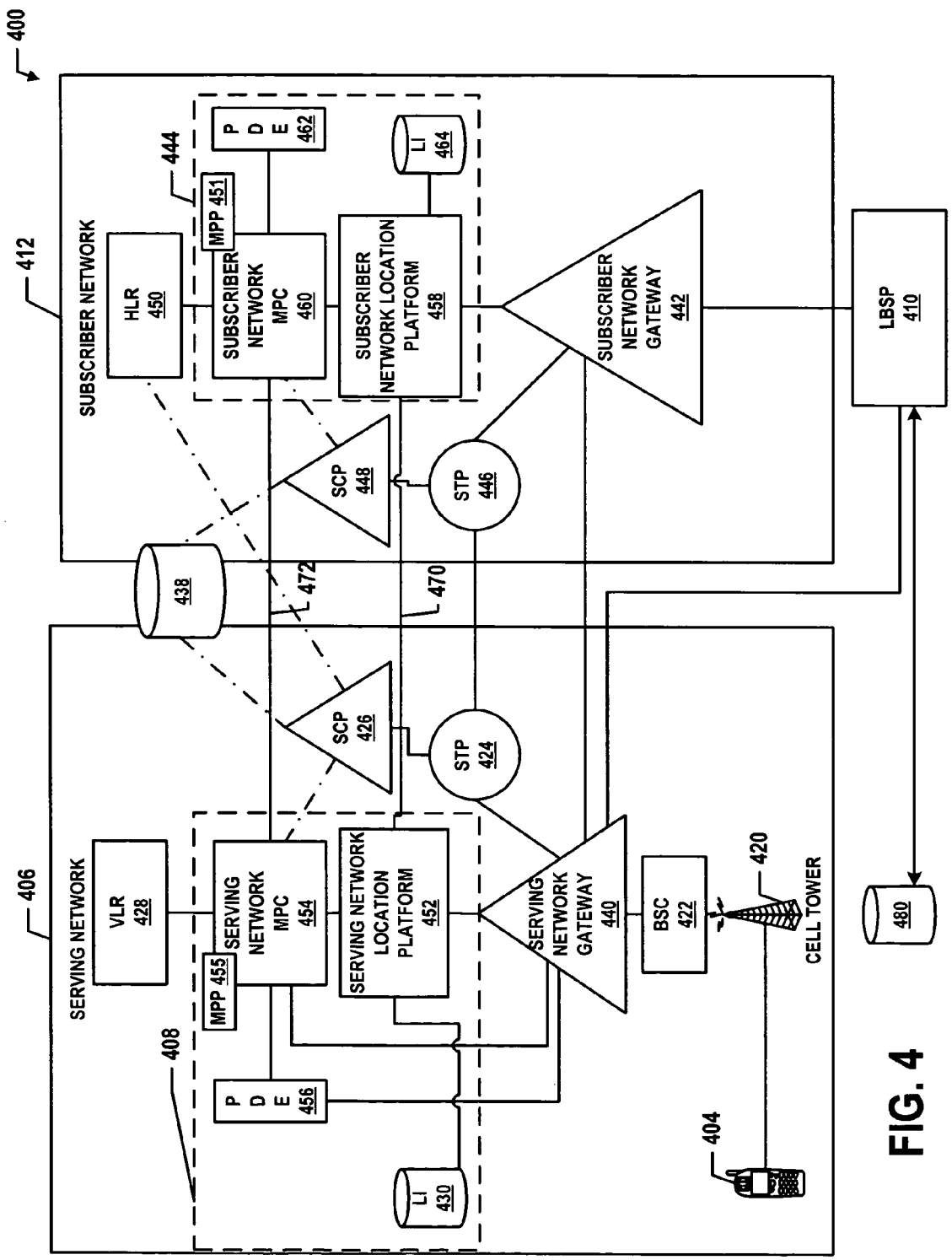
FIG. 4 is a second block diagram of a system for providing location based services to a mobile subscriber terminal roaming outside a coverage area of a location based service provider and inside a coverage area of a serving network.

FIG. 4 is a block diagram of one example of a system 400 for providing LBSs to a mobile subscriber terminal (MST) 404 roaming outside a coverage area of a subscriber network 412 and inside a coverage area of a serving network 406. In the system 400, a location based service provider (LBSP) 410 that is associated with the subscriber network 412 may provide location based services to subscribers of the subscriber network 412, such as MST 404, even when the subscribers are roaming in another network, such as the serving network 406.

As shown, the system 400 includes the MST 404, the serving network 406, the subscriber network 412, the LBSP 210, a GIS data store 480 and a shared database 438. The serving network 406 may include a base transceiver station (BTS) 420, a base station controller (BSC) 422, a serving-network gateway 440, a location system 408, a Signaling-Transfer point (STP) 424, a Service Control Point (SCP) 426, and a visitor location record (VLR) 428. The subscriber network 412 may include a subscriber-network gateway 442, a location system 444, a Signaling-Transfer point (STP) 446, a Service Control Point (SCP) 448, and a home location record (HLR) 450.

The MST 404 may be substantially the same as the MST 104, described with reference to FIG. 1. According to one embodiment, the MST 404 may be a third generation ("3G") or later mobile subscriber terminal capable of simultaneously engaging in voice and data sessions. As such, the MST 404 preferably operates in compliance with the 3GPP/3GPP2 industry specifications, with which those skilled in the art are very familiar. (The 3GPP/3GPP2 industry specifications may be found today at www.3gpp.org and www.3gpp2.org, respectively.)

Furthermore, the processing capabilities of the MST 404 may be determined in a variety of ways, including using a standardized framework such as the World Wide Web Consortium's (W3C's) "Composite Capabilities/Preference Profiles" (CC/PP) protocol. The CC/PP protocol specifies how client devices, such as MST 404, express their capabilities and preferences to servers that originate content, such as the serving network 406, LBSP 210, remote network 412, and location system 408. The Composite Capabilities/Preference Profiles Standard is fully incorporated herein by reference.

The serving and subscriber networks 406, 412 may be substantially the same as the serving and subscriber networks 106, 112 that are depicted in FIG. 1. Thus, serving and subscriber networks 406, 412 may include, in addition to the elements noted above, elements of Public Switched Telephone Networks, such as the hardware and services provided by local exchange carriers (LECs) and interexchange carriers (IXCs); private wireline networks, such as enterprise Private Branch Exchange; and/or public and private wireless networks, such as a Sprint PCS network and/or a license-free, Industrial, Scientific and Medical (ISM) band wireless network.

Some or all of these elements may be packet-switched elements, such as those making up the Internet. Alternatively, some or all of the elements of the serving and subscriber networks 406, 412 may be wired or wireless, and public or private. As such, the serving and subscriber networks 406, 412 may conform to known formats and protocols, such as those referenced above.

For instance, the architecture of and functions carried out by the BTS 420, BSC 422, serving-network gateway 440, VLR 428, subscriber-network gateway 442, and HLR 450 may be defined by the IS-2000 and/or IS-95 standards. Details of IS-2000 systems may be found in the TIA/EIA/IS-2000 standard, which was published on Mar. 1, 2001, and which is fully incorporated herein by reference. Furthermore, the details of IS-95 systems may be found in TIA/EIA/IS-95, which was published on May 1, 1992, and which is likewise fully incorporated herein by reference.

While the architecture of and the functions carried out by the STP 424, SCP 426, STP 446, and SCP 448 may be defined by the AIN and SS7 protocols, the IS-2000 and IS-95 protocols are designed to allow integration with the AIN and SS7 protocols. Details of a preferred architecture of the BTS 420, BSC 422, serving-network gateway 440, STP 424, SCP 426, VLR 428, subscriber-network gateway 442, STP 446, SCP 448, and HLR 450 are provided by U.S. patent application Ser. No. 10/161,497, filed Jun. 3, 2002, owned by the same assignee of the present application, and entitled "Method and System for Diverting Wireless Network Communications," which is fully incorporated herein by reference. Other known architectures may be used as well.

The BTS 420 provides a wireless coverage area within which the MST 404 can communicate. The BTS 420 may be communicatively coupled to the BSC 422. The BSC 422 in turn may be communicatively coupled to the serving-network gateway 440. The serving-gateway 440 may be embodied as a mobile-switching center (MSC) (not shown), a combination of an MSC and internetworking function (IWF) (not shown), a packet-data-serving node (PDSN) (not shown), and/or other device that may function as a gateway to other portions of the serving network 406, to the subscriber network 412 or to other networks. Typically, the switching of communications is performed by the gateway 440. The gateway 440 may also control, for example, the power levels of the BTS 420, directly or via the BSC 422.

Communicatively coupled to the serving-network gateway 440 is the location system 408, which may be deployed in substantially the same manner as the location system 108 that is shown in FIG. 1. Thus, the location system 408 may use any location determining technique to (i) determine and/or report the mobile positioning information associated with the MST 404 when operating in the serving system 406; and/or (ii) obtain and report geospatial information indicative of the serving network 406.

The location system 408 may include a mobile positioning center (MPC) 454, a position determining entity (PDE) 456, and a Location Information (LI) database 430, as defined, for example, by J-STD-036. The location system 408 may also include a location platform 452.

The location platform 452 may be one or more network nodes that are configured with a mobile positioning process (MPP) 455 to carry out the management of the location system 408. The MPP 455 may function to (i) receive requests for mobile positioning and geospatial information from the LBSP 410, (ii) check whether the LBSP 410 has permission to obtain the mobile positioning and geospatial information, (iii) request mobile positioning information from the MPC 454, (v) query the LI database 430 for navigational information, and (iv) respond to the request for mobile positioning information.

Also communicatively coupled to serving-network gateway 440 is the subscriber-network gateway 442. The subscriber-network gateway 442 may be embodied as a mobile-switching center (MSC) (not shown), a combination of an MSC and internetworking function (IWF) (not shown), a packet-data-serving node (PDSN) (not shown), and/or other device that may function as a gateway to other portions of the subscriber network 412, to the serving network 406 or to other networks. Typically, the gateway 442 performs switching of communications to other portions of the subscriber network 412, to the serving network 406 or to other networks.

The subscriber-network gateway 442 is also communicatively coupled the location system 444. The location system 444 may use any location determining technique to (i) determine and/or report the mobile positioning information associated with the MST 404 when operating the subscriber network 412; and/or (ii) obtain and report geospatial information indicative of the subscriber network 412. The location system 444 may include a mobile positioning center (MPC) 450, a position determining entity (PDE) 462, and a Location Information (LI) database 464, as defined, for example, by J-STD-036. The location system 412 may also include a location platform 458.

The location platform 458 may be one or more network nodes that are configured with a mobile positioning process (MPP) 451 to carry out the management of the location system 412. The MPP 451 may function to (i) receive requests for mobile positioning and geospatial information from the LBSP 410, (ii) check whether the LBSP 410 has permission to obtain the mobile positioning and geospatial information, (iii) request mobile positioning information from the MPC 460, (v) query the LI database 464 for navigational information, and (iv) respond to the request for mobile positioning information.

The LBSP 410 is substantially the same as the LBSP 110 shown in FIG. 1 except that the LBSP 410 is associated with the subscriber network 412. The LBSP 410 is communicatively coupled to the serving-network gateway 440, subscriber-network gateway 442, and the GIS data store 480. The GIS data store 480 may contain geospatial information about the coverage area of the serving network 406. The architecture of the GIS data store 480 may be substantially the same as the GIS data store 150 that is shown in FIG. 1.

As shown in FIG. 4, the MPC 454 of the serving network 406 and the MPC 460 of the subscriber network are communicatively coupled by communication link 472. Communications carried over the communication link 472 may conform to a standard and/or a proprietary protocol. The location platform 452 of the serving network 406 and the location platform 458 of the subscriber network 412 are communicatively coupled by communication link 470. Communications carried over the communication link 470 may conform to a standard and/or a proprietary protocol.

In addition, the shared database 438 is communicatively coupled to the SCP 426 and SCP 448. The shared database 438 may be any database, e.g, an Oracle database, that is capable of receiving, housing and disseminating the mobile positioning and geospatial information from the location system 408, the location system 444, and/or other location systems of other networks (not shown).

The HLR 450, which is communicatively coupled to the SCP 426 and the location system 444, serves as a centralized repository of information about the MST 404. Typically, the HLR 450 contains a subscriber profile that includes subscriber information for the MST 404, the last reported location of the MST 404, and the current status of the MST 404, such as whether it is active or inactive.

The subscriber profile may also contain metrics and parameters for carrying out enhanced services, such as location based services, to which the wireless MST 404 subscribes. The subscriber profile may be stored in the HLR 450 as a subscriber-data record cataloged by an identifier of the MST 404. This identifier may be a Mobile Identification Number (MIN), a dialed number, a Mobile Directory Number (MDN), a Electronic Serial Number (ESN), a mobile station identifier (MSID), a mobile equipment identifier (MEID), an Ethernet address, a medium-access-control (MAC) address, an internet protocol (IP) address or any other identifier of the MST 404. When the subscriber-network gateway 442 needs to find information about the MST 404, such as where it is located or what services it subscribes to, the subscriber-network gateway 442 queries the HLR 450 for the subscriber-data record of the MST 404.

The VLR 428, which is coupled to the location determining system 408, is a temporary data record for housing a working copy pf the service profile of the MST 404. This working copy defines the services available to MST 404 while it is in the coverage area of serving network 406. Thus, the serving network 406 has the option of allowing some of, all of, or none of, the services available to MST 406. If authorized, the MST 404 may be able to originate and to receive calls in the coverage area of serving network 406, in accordance with the working service profile record stored in the VLR 428.

Since the MST 404 is roaming on the serving network 406, mobile positioning information associated with the MST 404 may be determined using the location system 408, rather than the location system 444. When a user of the MST 404 obtains a subscription to the subscriber network 412, the MST 404 is programmed to access the LBSP 410 and not a location based service provider for the serving network 406. Consequently, the LBSP 410 may use the resources of location system 408 to obtain the mobile positioning information. When requested by LBSP 410, the location system 408, which is otherwise inaccessible for location-based requests for the MST 404, may function to determine and/or report the mobile positioning information associated with MST 404.

Even though the location system 408 may be directly inaccessible to the MST 404, the location system 408 and the LBSP 410 may reside on the same network, thereby having intra-network communication capabilities. Such conditions can occur when, for example, different network providers may use the same third party to supply LBSs, but by contract, other agreement and/or restriction, the third-party supplier partitions available location-determining systems for each network. As such, the location system 408 and the LBSP 410 may reside in one or more networks other than the serving and remote networks 406, 412. More typically, however, the location system 408 and the LBSP 410 may reside on different networks, e.g., the serving network 406 and remote network 412, respectively; yet may communicate via various interconnections between the different networks.

To request location based services, the MST 404 may send to the BTS 420 a request for LBSs that is directed or otherwise addressed to the LBSP 410. But before such a request may be made, the MST 404 has to register in the serving network 406.

Registration

Generally, the MST 404 will attempt to register when powering up or roaming into the wireless coverage area of the serving network 406. The MST 404 may also become registered because of a handoff to the serving network 406. Alternatively, the MST 404 may also be programmed to attempt to re-register periodically, for instance, every 10 minutes. Other registration schemes are possible as well.

Details on carrying out a registration of a MST are provided in Michael D. Gallagher and Randall A. Snyder, "Mobile Telecommunications Networking With IS-41" (McGraw-Hill 1997). Further details for carrying out a registration in both public and private wireless networks are provided by commonly-assigned, co-pending U.S. application Ser. No. 10/161,313, filed on Jun. 3, 2002, and entitled "Method and System for Intersystem Wireless Communications Session Handoff," and commonly-assigned, co-pending U.S. patent application Ser. No. 10/161,497, filed on Jun. 3, 2002, entitled "Method and System for Diverting Wireless Network Communications," both of which are fully incorporated herein by reference.

Figure 5:
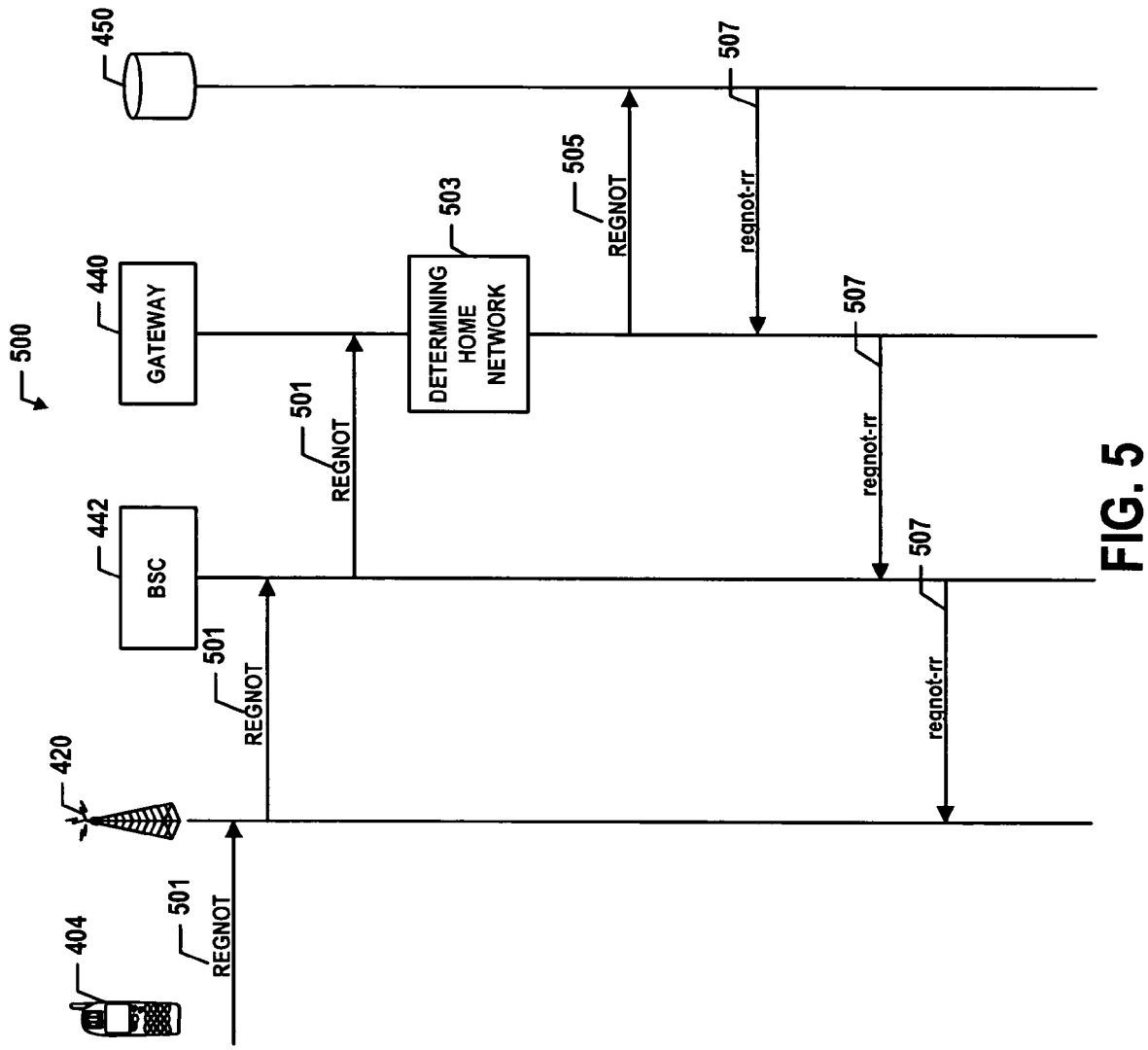
FIG. 5 is a second call flow diagram showing the signaling that takes place when a mobile subscriber terminal attempts to register with a serving network.

FIG. 5 is a call flow diagram illustrating the call-flow 500 of signaling that may take place when a MST, such as MST 404 attempts to register with a serving network, such as the serving network 406 shown in FIG. 4. Unless otherwise noted, the call flows described herein with respect to FIG. 5 (and various other appended figures) are based on the use of the IS-2000 and/or IS-95 standards. However, it is to be understood that other signaling systems or protocols could alternatively be used.

The registration attempt begins when MST 404 transmits a registration request message 501. Registration request message 501 signifies that MST 404 is attempting to register and typically includes the MIN and ESN of MST 404, and other IS-41 parameters as registration request information. The BTS 420 receives the registration request message 501 and relays it to the BSC 442. The BSC 442 then relays the registration request message 501 to the serving-network gateway 440.

Using the MIN, ESN and/or other identifying information associated with MST 404, the serving-network gateway 440 may determine the home network of the MST 404 as shown in call flow element 503. The home network of the MST 404 may be, for example, the subscriber network 412. The serving-network gateway 440 uses the information associated with the subscriber network 412 to locate the HLR 450.

Once located, the serving-network gateway 440 may then transmit to the HLR 450 a registration notification ("REGNOT") message 505. The REGNOT message 505, in addition to carrying the MIN and ESN of the MST 404, may also include a number of other parameters to control communication with the MST 404 once it is registered. For example, the REGNOT message 505 typically includes parameters that identify the gateway (e.g., MSCID), the system identifier (e.g., SYSID), and the network identifier (e.g., NETID) of the serving network 406 when reporting the registration attempt of the MST 404.

After receipt of the REGNOT message 505, the HLR 450 uses the identifying information to try to locate the subscriber-data record for the MST 404. Sometime after the HLR 450 finds the subscriber-data record for the MST 404, it transmits the subscriber-data record, or some portion thereof, to serving-network gateway 440, for example, in a registration notification return result ("regnot_rr") message 507. The serving-network gateway 440 in turn passes the regnot_rr message 507 to the BSC 442, and thereafter to the BTS 420 to allow access to the serving network 406.

The serving-network gateway 440 may use the service-profile information contained in the subscriber-data record in the form that it is retrieved. Alternatively, the serving-network gateway 440 may modify or completely override the service-profile information. In any case, the serving-network gateway 440 may then store the working copy of service profile in the VLR 428.

Before being granted access to the VLR 428, certain privacy and permission credentials may be required to access and obtain the service-profile information. For example, the VLR 428 may include privacy and permission information that functions to authorize access to any of the services subscribed to or to any information obtained on a transactional basis, such as mobile positioning information. Alternately, the privacy and permission credentials may be stored in the subscriber network location system 444 and be passed or returned upon request to the serving network 408.

How much of the service-profile and/or mobile positioning information that is made available may be varied using various forms of the privacy and permission information. For instance, different authorization levels may be defined based on how granular or what type of mobile positioning information should be supplied to requests for such information.

The subscriber of the MST 404 may limit access to all of the subscriber profile and mobile positioning information to only a select group of authorized persons and/or computers, such as the user, people or computers that the user has specified, the user's home network provider, law enforcement officials, and/or others with a need to know such information. Typically, a high level of authentication, e.g., encrypted and/or certified public key infrastructure (PKI), may be required to prove authorization.

Alternatively, non-home serving networks and/or LBSPs, such as LBSP 410 may be authorized to obtain specific location or mobile positioning information for carrying out a location based service request. Differing levels of protection may be devised for these entities. For instance, the subscriber database may be programmed so that the authentication credentials needed increase as the granularity of mobile positioning information increases. In this example, mobile-position-information requests for details concerning cell information that the MST 404 is operating in, may not require any authorization. Requests for sector information may require a simple password. And requests for latitude, longitude, and bearing information may require the use of cipher or security keys, like those noted above. Other stratification of privacy and permission information may be used as well.

The privacy and permission information may be programmed for each service or globally to all the services that the user subscribes to. This information may be programmed in the subscriber database when the underlying services are registered. Alternatively, the privacy and permission information may be uploaded from the MST 404 into the HLR 450 and/or the VLR 428 upon registration with, or upon a request for services from, the serving network 406.

For example, when a user sends a request for location based services, the user's MST 404 may automatically provide to the serving network location system 408, subscriber network location system 444, HLR 450 and/or the VLR 428 the privacy and permission information. This, in turn, allows the serving-network gateway 440 to relay or otherwise transmit the request for services along with an indication of how granular the location information should be. To accomplish sending such a request, the MST 404 may have a locally-stored user profile or instance thereof (not shown) that indicates the user preferences for location granularity (generally or per service). The MST 404 may refer to this locally-stored user profile when sending a location-based service request.

Alternately, when a user sends a request for location based services, the LBSP 410, HLR 450, or subscriber network location system 444 may automatically provide to the VLR 428 and/or serving network location system 408 the privacy and permission information. This, in turn, allows the LBSP 410, HLR 450, or subscriber network location system 444 to relay or otherwise transmit the request for services along with an indication of how granular the location information should be. To accomplish sending such a request, the user may have a user profile or instance thereof (not shown) stored in the LBSP 410, HLR 450, or subscriber network location system 444 that indicates the user preferences for location granularity (generally or per service). The user may use any conventional means to add/change/delete privacy and permission setting in the user profile.

Serving a Location-Based Service

Figure 6:
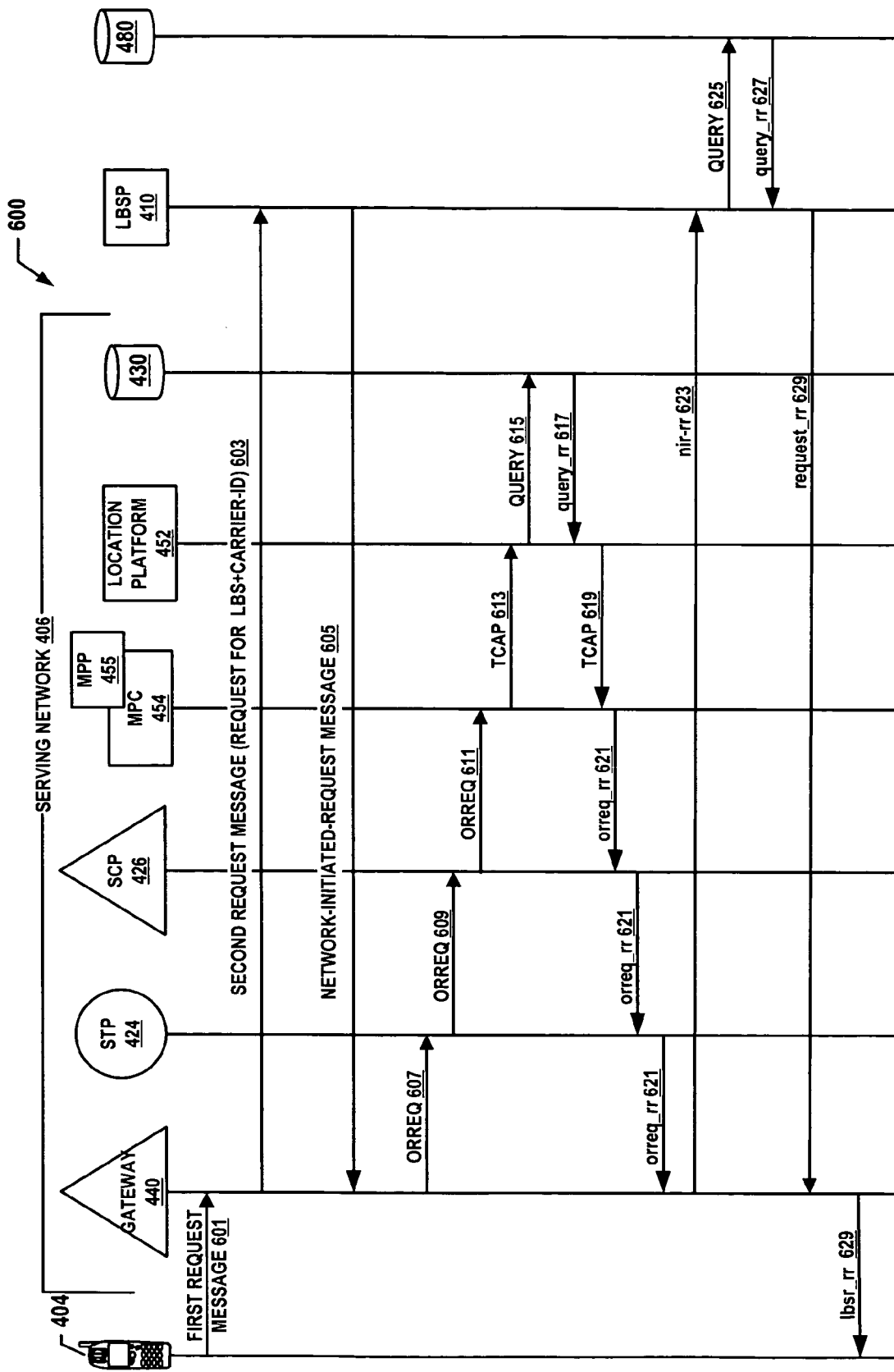
FIG. 6 is a third call flow diagram illustrating a call flow for serving an LBS in a system, such as the system shown in FIG. 4.

FIG. 6 is a call flow diagram illustrating a call flow 600 for serving an LBS in a system, such as the system 400 shown in FIG. 4. After registration in the serving network 406, a user of the MST 404 may initiate a request for an LBS from the LBSP 410. To do so, the user of the MST 404 may enter digits or characters into the MST 404 and then press a "Talk" or "Send" key or select a wireless web LBS application that initiates a request for an LBS.

The dialed digits and/or characters may be sent to the serving-network gateway 440 as a first request message 601 that may be, for example, formatted according to IS-2000 and/or IS-95. As such, the first request message 601 may contain information identifying the serving network 406 that is normally sent, for example, as part of an IS-2000 and/or IS-95 message (e.g., the MSCID, SYSID and NETID parameters).

After receipt of the first request message 601, the serving-network gateway 440 parses the information identifying the serving network 406 (hereinafter referred to as a "carrier-ID") from the first request message 601 so as to preserve the carrier-ID, which will change if the first request message 601 traverses from the serving network 406 to the subscriber network 412. The serving-network gateway 440 then couples (e.g., inserts, appends, integrates into, commingles, encapsulates, or otherwise associates) the carrier-ID to the request for an LBS and then places the combination in a second request message 603. Thereafter, the serving-network gateway 440 sends the second request message 603 to the LBSP 410.

After receiving the second request message, the LBSP 410 may parse the carrier-ID from the request for the LBS contained in the second request message 603. The LBSP 410 may then use the carrier-ID to address or otherwise direct to the serving-network gateway 440 a network-initiated-request message 605 to obtain the mobile-position information associated with the MST 404. Thereafter, the LBSP 410 may send the network-initiated-request message 605 back to the serving-network gateway 440.

The serving-network gateway 440 handles the call processing for the network-initiated-request message 605, and initiates a process to send a first Origination Request message (ORREQ) 607 to the STP 424. The STP 424 selects the SCP 426 and forwards to it a second ORREQ message 609.

The second ORREQ message 609 may contain an indication that the destination for the second ORREQ message 609 is a router process on the MPC 454. Also contained in the ORREQ message 409 are numerous parameters, preferably including the telephone number of the MST 404, the ESN of the MST 404, the granularity of mobile positioning information that is authorized, the frequency and band class of the serving base station, and the base station's Cell ID and Sector ID. The SCP 426 may glean some or all of this information from the HLR 450 and/or VLR 428.

Based on the destination indication within the second ORREQ message 609, the SCP 426 sends to the MPP 455 running on the MPC 454 a third ORREQ message 611 containing the parameters in the second ORREQ message 409. The MPP 455 may then compare the carrier-ID against an internal table or list to determine if the serving network 406 is authorized to provide location based services to the mobile subscriber terminal 404. The comparison may be carried out to determine whether the serving network 406 has partnered with the subscriber network 412 as well as privacy purposes.

Once authorization is given, the MPP 455 may responsively query the serving-network location platform 452 by way of a Transaction Capabilities message (TCAP) 613. The MPP 455 may also provide the location platform 452 with the Cell ID and Sector ID of the BTS 420. The location platform 452 may then send a first query message 615 to the LI database 430 for the MSCID, Cell ID and Sector ID to obtain a cell-sector's centroid, which may be a relative center of the coverage of a cell sector. Responsive to the first query message 615, the LI database 430 returns the requested information in a first query_rr message 617.

If the location granularity for the request is authorized for only cell sector centroid, then the location platform 452 responds to the MPP 455 using a second TCAP message 619, the content of which may include the cell-sector's centroid. The MPP 455 then responds to the third ORREQ message 611 with an ORREQ Return Result (orreq_rr) message 621, which in turn contains the cell-sector'sector's centroid. This information is passed back to the serving-network gateway 440, which then sends to the LBSP 410 a response to the network-initiated-request message in the form of a network-initiated-request return result (nir_rr) message 623, which contains the information from the orreq_rr message 621.

After the LBSP 410 obtains the cell-sector's centroid from the nir_rr message 623, it may issue a second query message 625 to the GIS data store 480 to obtain geocode data corresponding to the cell-sector's centroid. Responsive to the second query 625, the GIS data store 480 returns to the LBSP 410 a query return result (query_rr) message 627 containing the geocode information. Using the cell-sector's centroid received from the location platform 452 and the geocode, the LBSP 410 formulates a response to the request for the LBS. Thereafter, the LBSP 410 sends to the MST 404 via the serving-network-gateway 440 a requester_rr message 629 containing the response to the request for the LBS.

Figure 7:
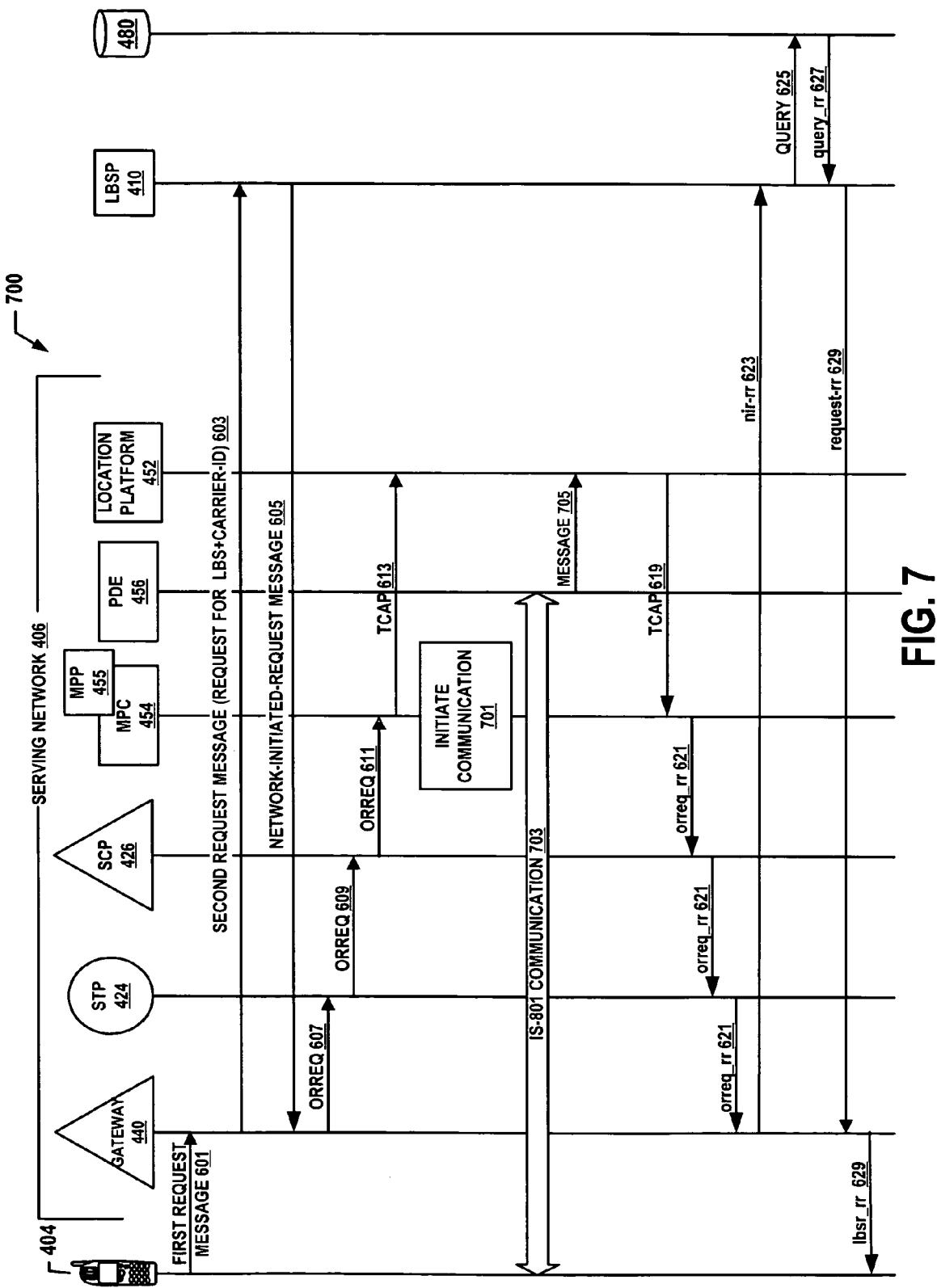
FIG. 7 is a fourth call flow diagram illustrating a call flow for serving detailed mobile positioning information to a mobile subscriber terminal in a system, such as the system shown in FIG. 4.

FIG. 7 is a call flow diagram illustrating a call flow 700 for serving detailed mobile positioning information to the MST 404 in a system, such as the system 400 shown in FIG. 4. The call flow 700 shown in FIG. 7 is similar to the call flow 600 shown in FIG. 6, except as described herein. Included in FIG. 7 is the PDE 456 for the serving network 406. As described in the J-STD-036 standard, the MPC 454 may use the PDE 456 to provide more granular mobile positioning information than the can be provide by MPC 454 alone. Thus, if authorized for detailed mobile positioning information for the MST 404 and if the MST 404 is compatible with the PDE 456, then the MPC 454 may use the PDE 456 to obtain the detailed mobile positioning information.

Referring now to FIG. 7 at call flow element 701, the MPC 454 may initiate a communication, e.g., an IS-801-A communication 703, between the MST 404 and the PDE 456 (assuming the MST 404 is compatible with the PDE 456) to obtain mobile positioning information about the MST 404. Details of the IS-801-A standard may be found in the TIA/EIA/IS-801-A standard, which was published by Telecommunications Industry Association, on Apr. 7, 2004, and which is fully incorporated herein by reference.

The PDE 456 may receive mobile positioning information from the MST 404 itself. To determine its position, however, the PDE 456 may provide to the MST 404 some baseline navigational information to enable the MST 404 to roughly establish its position. The MST 404 may then use a terrestrial positioning system, a celestial positioning system, or a combination of these systems to establish its position. Terrestrial positioning systems utilize various techniques, such as forward link trilaterization ("FLT"), advanced forward link trilaterization ("AFLT"), amplitude difference, angle of arrival ("AD-AOA"), and enhanced observed time difference ("EOTD") to generate mobile positioning information. GPS is an example of a celestial positioning system.

In response to the baseline navigational information, the MST 404 may return to the PDE 456 more precise navigational information including, for example, GPS coordinates and/or pseudo range information as defined by IS-801, and/or pseudorandom noise (PN) code offset measurements as defined by IS-801. If not already supplied in latitude, longitude, bearing, etc, the PDE 456 may then perform signal processing on the data retrieved from the MST 404 to generate mobile positioning information in this format. The PDE 456 may then forward this navigational information to the location platform 452 in a J-STD-036 message 705. The location platform 452 may then send the second TCAP 619 as described above. The second TCAP 619 contains the navigational information provided by the PDE 456.

Alternatively, the location platform 452 may send the navigational information to a Wireless Automatic Location Information (WALI) process as defined in J-STD-036 standard. The WALI process may send the navigational information to the Location Information (LI) database 430 for transmission to the MPC 454. In another alternatively, the location platform may place the navigational information in a pull table (not shown), where the MPC 454 or other entity, such as the LBSP 410, can retrieve it.

Remote-System MPC Initiated Request

Figure 8:
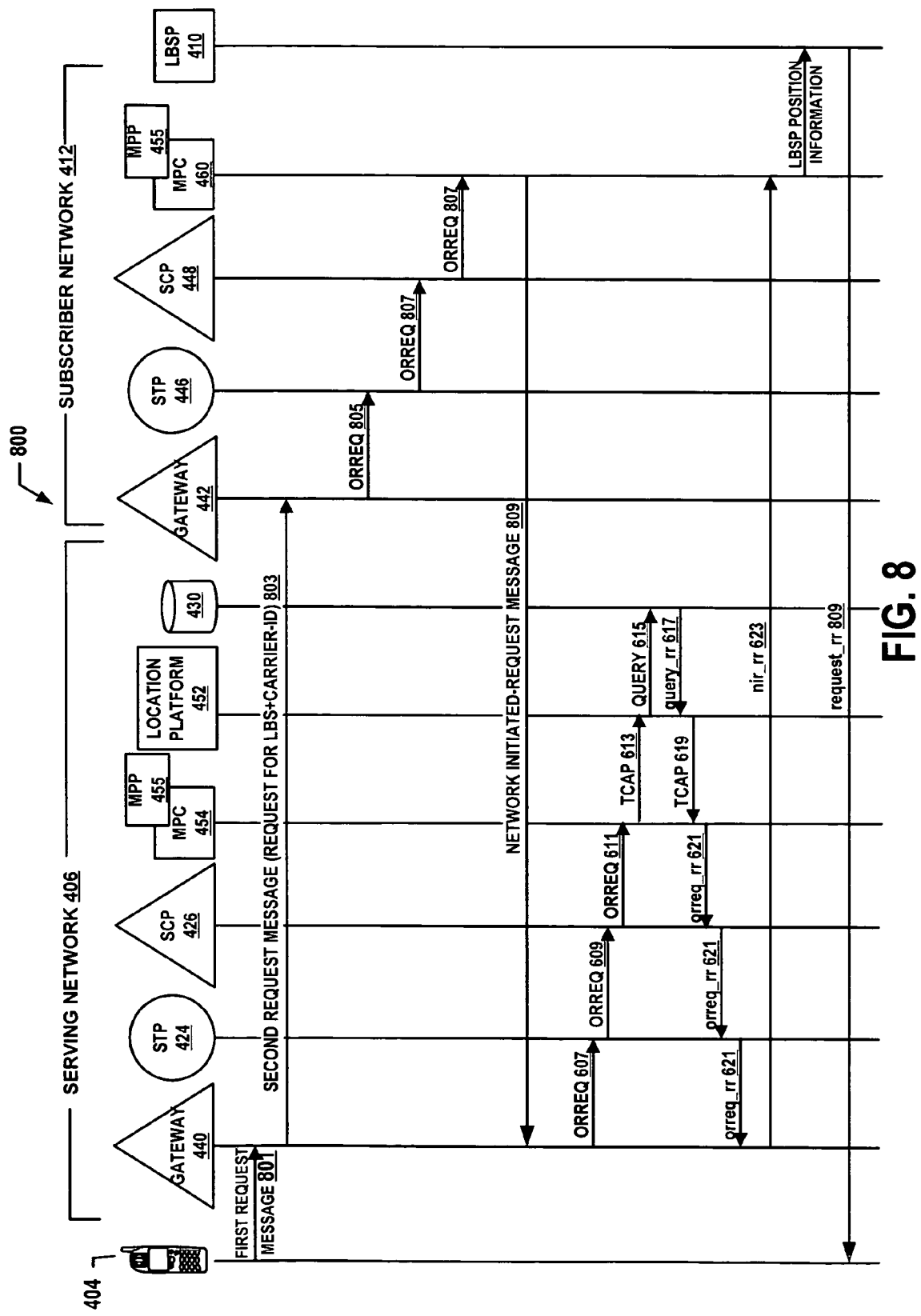
FIG. 8 is a fifth call flow diagram illustrating a call flow for serving LBSs to a mobile subscriber terminal in a system, such as the system shown in FIG. 4.

FIG. 8 is a call flow diagram illustrating a call flow 800 for serving LBSs to the MST 404 in a system, such as the system 400 shown in FIG. 4. In this call flow 800, a request for an LBS may be terminated to the MPC 460 associated with the subscriber network 412, instead of the LBSP 410, thereby reducing the amount of back and forth communications between the serving network 406, the subscriber network 412 and the LBSP 410.

Referring now to FIG. 8, a user of the MST 404 may initiate a request for an LBS from the LBSP 410. To do so, the user of the MST 4040 may enter digits or characters into the MST 404 and then press a "Talk" or "Send" key. The digits and/or characters may be sent to the serving-network gateway 440 as a first request message 801 that may be, for example, formatted according to IS-2000 and/or IS-95. As such, the first request message 801 may contain information identifying the serving network 406 that is normally sent, for example, as part of an IS-2000 and/or IS-95 message.

After receipt of the first request message 801, the serving-network gateway 440 parses the information identifying the serving network 406 (hereinafter referred to as a "carrier-ID") from the first request message 801 so as to preserve the carrier-ID, which will change if the first request message 801 traverses from the serving network 406 to the subscriber network 412. The serving-network gateway 440 then couples (e.g., inserts, appends, integrates into, commingles, encapsulates, or otherwise associates) the carrier-ID to the request for an LBS and places the combination in a second request message 803. Thereafter, the serving-network gateway 440 sends the second request message 803 to the subscriber-network gateway 442.

The subscriber-network gateway 442 handles the call processing for the second request message 803, and initiates a process to send a first ORREQ message 805 to the STP 446 of the subscriber network 412. The STP 446 selects an SCP 448 of the subscriber network 412 and sends a second ORREQ message 807 to the SCP 448.

This second ORREQ message 807 may contain an indication that the destination for the ORREQ message 807 is a router process on the MPC 460 as defined by the J-STD-036 standard. The SCP 448 relays the second ORREQ message 807 to the router process on the MPC 460. Using the carrier-ID, the router process of the MPC 460 sends to the serving-network gateway 440 a network-initiated request message 809. The network-initiated request message 809 contains a request for mobile positioning information associated with the MST 404 and geospatial information associated with the serving network 406.

After the serving-network gateway 440 receives the network-initiated request message 809, the call flow elements 607 through 623 proceed in a manner similar to that described above in reference to FIG. 6, except that the serving-network gateway 440 communicates the nir_rr message 623 to the MPC 460 instead of sending it to the LBSP 410. After the MPC 460 receives the mobile positioning information for the MST 404, it then forwards the mobile positioning information to the LBSP 410. The LBSP 410 then sends to the MST 404 via the serving-network-gateway 440 a request_rr message 809 containing the response to the request for the LBS.

Alternatively, instead of passing the mobile positioning information back to the subscriber network 412, the MPC 454 may include in the orreq_rr message 621 an indication that the mobile positioning information is available in the LI database 430 or the shared database 438 (shown in FIG. 4) rather than the actual mobile positioning information. This way, the serving-network and remote-network MPCs 454, 460 and/or other network entities can share mobile positioning information for the MST 404 along with other MSTs operating on each system.

Figure 9:
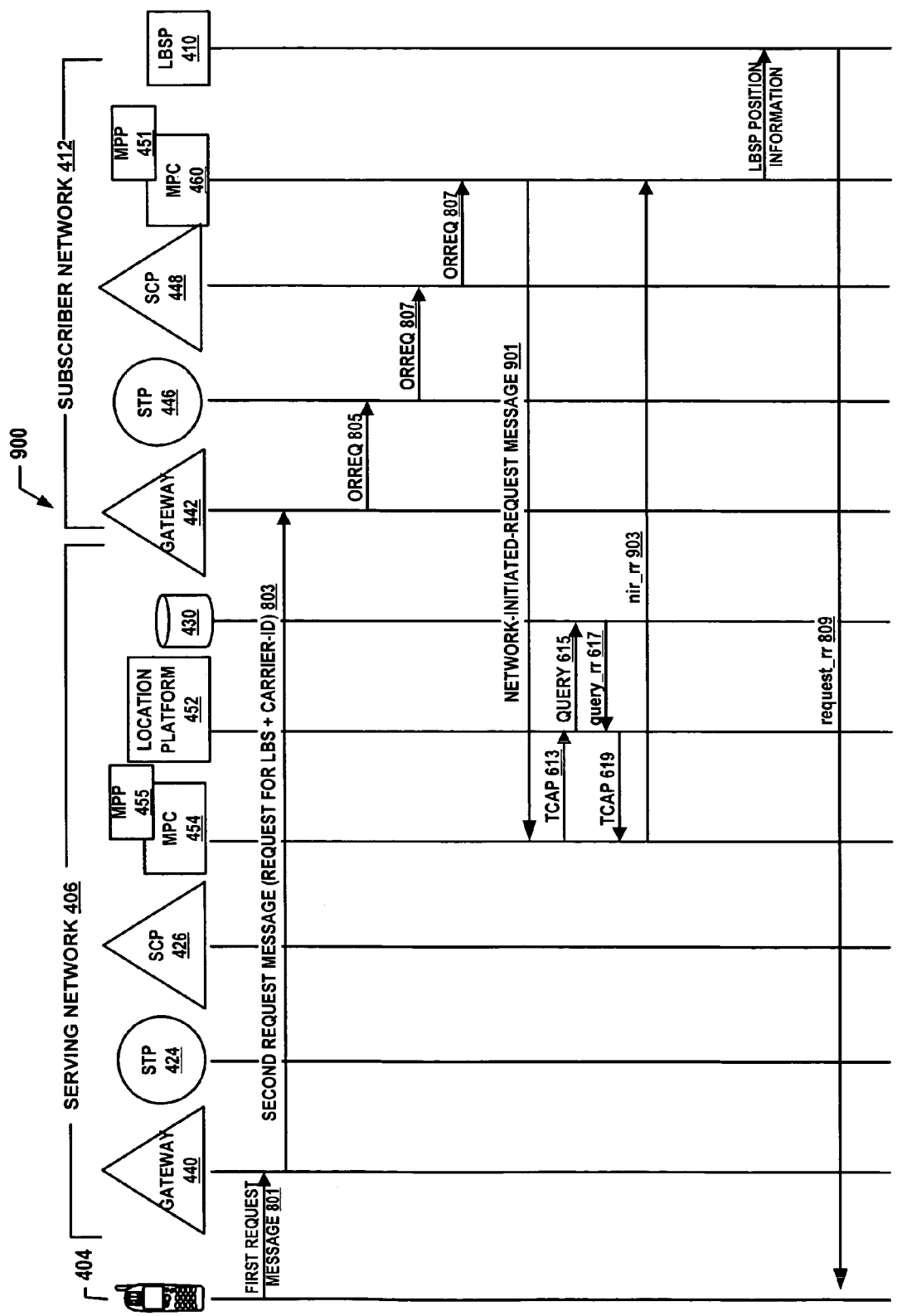
FIG. 9 is a sixth flow diagram illustrating another call flow for serving LBSs to a mobile subscriber terminal in a system, such as the system shown in FIG. 4

FIG. 9 is a call flow diagram illustrating another call flow 900 for serving LBSs to the MST 404 in a system, such as the system 400 shown in FIG. 4. The call flow 900 shown in FIG. 9 is similar to the call flow 800 shown in FIG. 8, except as described herein. In this call flow 900, the MPC 460 communicates directly with the MPC 454 (e.g., over the communication link 472 shown in FIG. 4), thereby reducing the amount of back and forth communications between the serving network 406, the subscriber network 412 and the LBSP 410. Although the call flow messages are described using IS-200 and/or IS-95 messages, the messaging may be carried out using other standard and non-standard protocols.

Referring now to FIG. 9, after the router process on the MPC 460 receives the second ORREQ message 807, the router process of the MPC 460 may look up the carrier-ID in an internal table or list to determine the address of the MPC 454. Using the carrier-ID, the MPC 460 then may create a network-initiated request message 901 and address it to the MPC 454. The network-initiated request message 901 contains a request for mobile positioning information associated with the MST 404 and geospatial information associated with the serving network 406.

Thereafter the MPC 460 sends the network-initiated request message 901 to the MPC 454. After the MPC 454 receives the network-initiated request message 901, the call flow elements 613 through 619 proceed in a manner similar to that described above in reference to FIG. 6. After the receiving the mobile positioning information associated with the MST 404 and geospatial information associated with the serving network 406, the MPC 454 sends this information back the MPC 460 in a response to the network-initiated-request (nir_rr) message 903. After the MPC 460 receives the mobile positioning information for the MST 404, it forwards the mobile positioning information to the LBSP 410.

In another embodiment, instead of the MPCs 454, 460 communicating directly, the location platforms 452, 458 (shown in FIG. 4) may exchange the mobile positioning and geospatial information via communication link 470. Further, the location platforms 452, 458 may store the mobile positioning and geospatial information in the shared database 438 for retrieval by the entities of the serving network 406, the subscriber network 412, and other networks (not shown).

CONCLUSION

In the foregoing detailed description, numerous specific details are set forth in order to provide a thorough understanding of the embodiments described herein. In view of the wide variety of embodiments to which the principles of the present invention can be applied, it should be understood that the embodiments described herein should not be taken as limiting the scope of the present invention.

For example, the flow 200 and call flows 500, 600, 700, 800, and 900 described may be taken in sequences other than those described, and more or fewer elements may be used in the block diagrams. The call flows may be implemented in existing telecommunications networks using software, firmware, hardware or a combination thereof.

Further, the claims should not be read as limited to the described order or elements unless stated to that effect. For example, the call flows describe network elements that send signals to or received signals from other network elements. As will be understood by those skilled in the art, such transmissions are not to be construed as being limited to a direct physical connection between the identified network elements, but rather, also include indirect physical connection utilizing intermediate network elements.

Therefore, all embodiments that come within the scope and spirit of the following claims and equivalents thereto are claimed as the invention. It will be understood, however, that changes and modifications may be made to the invention without deviating from its true spirit and scope, as defined by the following claims.

We claim:

1. A method for locating a mobile subscriber terminal that is roaming in a coverage area of a serving network, the method comprising:

a location based service provider that is outside of the serving network receiving from the serving network (i) a request for location based services and (ii) an identifier that is indicative of a first location system that is associated with the serving network, wherein the request for location based services is initiated by the mobile subscriber terminal, and the identifier is provided by the serving network;

responsive to the request for location based services, the location based service provider sending to a second location system (i) a request for mobile positioning information for the mobile subscriber terminal, and (ii) the identifier, wherein the second location system is associated with a subscriber system to which the mobile subscriber terminal subscribes;

the second location system sending the request for mobile positioning information to the first location system, wherein the request for mobile positioning information is directed to the first location system based on the identifier;

the second location system receiving the mobile positioning information from the first location system; and the second location system sending the mobile positioning information to the location-based-service provider.

2. The method of claim 1, further comprising: the location based service provider sending to the serving network a reply to the request for location based services for transmission to the mobile subscriber terminal.

3. The method of claim 1, further comprising the location based service provider formulating the reply to the request for location based services based at least in part on a function of the mobile positioning information.

4. The method of claim 1, wherein the serving network comprises a geographical-information system, and further comprising:

the location based service provider sending to the serving network a request for geospatial content associated with the mobile-position information; and the location based service provider receiving the geospatial content from the serving network.

5. The method of claim 1, further comprising the location based service provider formulating the reply to the request for location based services based at least in part on a function of the geospatial content.

6. The method of claim 1, further comprising:
the location based service provider sending a request for geospatial content associated with the mobile position information to a geographical-information system associated with the serving network; and
the location based service provider receiving the geospatial content from the geographical-information system.

7. The method of claim 1, wherein the geographical-information system comprises a database that contains geospatial content that is limited to the coverage area the serving network.

8. The method of claim 1, wherein the geographical-information system comprises a database that contains geospatial content that is limited to a given national boundary.

9. The method of claim 1, wherein permission information for the mobile subscriber terminal is maintained in a subscriber database, and further comprising the first location system requesting from the subscriber database permission to obtain mobile positioning information.

10. The method of claim 1, wherein permission information for the mobile subscriber terminal is maintained in a subscriber database, and further comprising the first location system requesting from the subscriber database permission to provide mobile positioning information.

11. The method of claim 1, wherein permission information for the mobile subscriber terminal is maintained in a subscriber database, and further comprising the second location system requesting from the subscriber database permission to obtain mobile positioning information.

12. The method of claim 1, wherein permission information for the mobile subscriber terminal is maintained in a subscriber database, and further comprising the second location system requesting from the subscriber database permission to provide mobile positioning information.

13. A method for providing locating a mobile subscriber terminal that is roaming in a coverage area of a serving network, the method comprising:
a location based service provider that is outside of the serving network receiving from the serving network (i) a request for location based services and (ii) an identifier that is indicative of a first mobile position center that is associated with the serving network, wherein the request for location based services is initiated by the mobile subscriber terminal, and the identifier is provided by the serving network;
responsive to the request for location based services, the location based service provider sending to a second mobile-position center (i) a request for mobile positioning information for the mobile subscriber terminal, and (ii) the identifier, wherein the second mobile-position center is associated with a subscriber system to which the mobile subscriber terminal subscribes;
the second mobile position center sending the request for mobile positioning information to the first mobile position center, wherein the request for mobile positioning information is directed to the first mobile position center based on the identifier;
the second mobile position center receiving the mobile positioning information from the first mobile position center;
the second mobile position center sending the mobile positioning information to the location-based-service provider; and
the second mobile position center receiving the mobile positioning information from the first mobile-position center.

14. The method of claim 13, further comprising the location based service provider sending to the serving network a reply to the request for location based services for transmission to the mobile subscriber terminal.

15. The method of claim 14, further comprising the location based service provider formulating the reply to the request for location based services based at least in part on a function of the mobile positioning information.

16. The method of claim 14, wherein the serving network comprises a geographical-information system, and further comprising:
the location based service provider sending to the serving network a request for geospatial content associated with the mobile-position information; and
the location based service provider receiving the geospatial content from the serving network.

17. The method of claim 16, further comprising the location based service provider formulating the reply to the request for location based services based at least in part on a function of the geospatial content.

18. The method of claim 14, further comprising:
the location based service provider sending a request for geospatial content associated with the mobile position information to a geographical-information system associated with the serving network; and
the location based service provider receiving the geospatial content from the geographical-information system.

19. The method of claim 14, further comprising the first mobile position center determining the mobile positioning information.

20. The method of claim 13, wherein the first location system further comprises a position-determining entity, wherein the position-determining entity receives navigational information from the mobile subscriber terminal and sends it to the first mobile-position center, and wherein the second mobile position center receives the mobile positioning information from the first mobile-position center.

21. The method of claim 15, wherein permission information for the mobile subscriber terminal is maintained in a subscriber database, and further comprising the second mobile position center requesting from the subscriber database permission to obtain mobile positioning information.

22. The method of claim 15, wherein permission information for the mobile subscriber terminal is maintained in a subscriber database, and further comprising the second mobile position center requesting from the subscriber database permission to provide mobile positioning information.

23. The method of claim 15, wherein permission information for the mobile subscriber terminal is maintained in a subscriber database, and further comprising the first mobile position center requesting from the subscriber database permission to obtain mobile positioning information.

24. The method of claim 15, wherein permission information for the mobile subscriber terminal is maintained in a subscriber database, and further comprising the first mobile position center requesting from the subscriber database permission to provide mobile positioning information.

25. The method of claim 20, wherein permission information for the mobile subscriber terminal is maintained in a subscriber database, and further comprising the position-determining entity requesting from the subscriber database permission to provide mobile positioning information.

* * * * *